Patented Oct. 20, 1925.

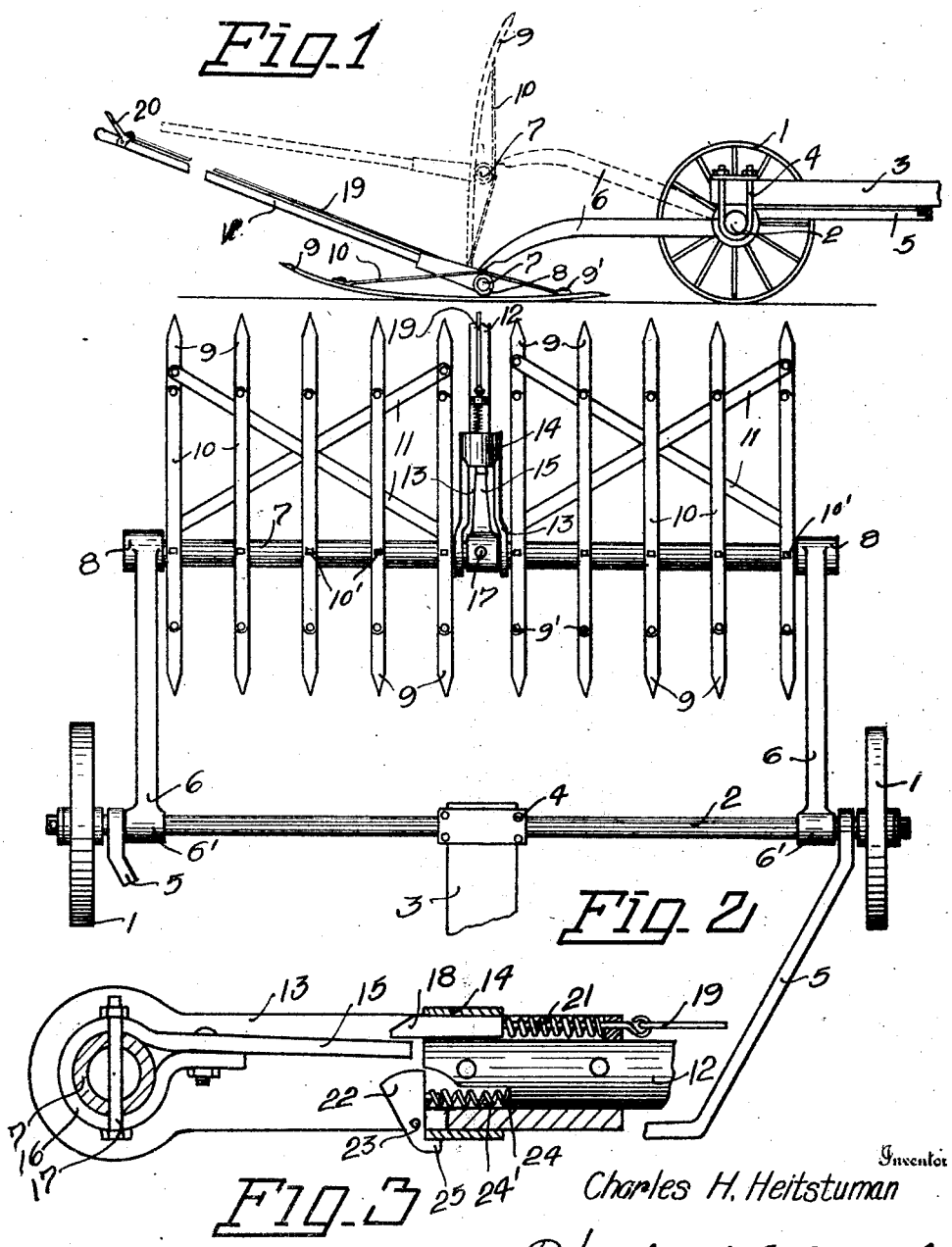

1,557,584

UNITED STATES PATENT OFFICE.

CHARLES H. HEITSTUMAN, OF UNIONTOWN, WASHINGTON.

DRAG.

Application filed August 8, 1923. Serial No. 656,439.

*To all whom it may concern:*

Be it known that I, CHARLES H. HEITSTUMAN, a citizen of the United States, residing at Uniontown, in Whitman County and State of Washington, have invented certain new and useful Improvements in Drags, of which the following is a specification.

My present invention relates to improvements in drags or agricultural implements of the horse drawn, wheel supported type, especially adapted for use in picking up, conveying, and dumping materials on the grain field. As is well known to those familiar with farm work, after the hay or straw stacks on the field have been removed the material that has lain in contact with the soil is found to be a knotted, moist and matted mass, unfit for ordinary use, and difficult of disposal when hand implements, as pitchforks are used. This material is especially valuable as a very rich fertilizer, to be spread upon and plowed into the soil. The primary object of my invention is the provision of an implement of the above indicated character by means of which this material may be picked up, conveyed to and dumped on the field for scattering as a fertilizer. By the utilization of my invention this otherwise waste material may be disposed of quickly and at slight expense for labor, and the material used to enhance the value of the soil. The implement is comparatively cheap in cost of production, simple in construction and operation, strong and durable, and adapted for many uses about the farm other than the specific use mentioned above.

In the accompanying drawings I have illustrated one complete example of the physical embodiment of my invention wherein the parts are combined and arranged according to the best mode I have thus far devised for the practical application of the principles of my invention.

Figure 1 is a view in side elevation of the implement of my invention, showing in full lines its position when used as a conveyer, and in dotted lines its position when dumping the load.

Figure 2 is a top plan view of the drag, part of the draft device being broken away for convenience of illustration.

Figure 3 is an enlarged detail sectional view showing the release device for use in dumping the load.

In carrying out my invention I utilize a horse drawn implement supported on a pair of wheels as 1, 1 that are journaled on the axle 2 to which the draft tongue 3 is attached as by U-bolts 4. Usual side braces 5 are employed to form a rigid draft structure, the braces being attached at their front ends to the tongue 3.

The device of the invention is located at the rear of the axle and supported therefrom by means of a pair of spaced side arms 6, 6, which at their forward ends are pivoted on the axle 2 at 6′ in order that these arms may swing in a vertical plane with the axle as a center. At their rear ends the arms carry a rock shaft 7, journaled in bearings 8, 8 formed at the extremities of the arms and this rock shaft extends parallel with the axle at the rear thereof. The rock shaft is designed to support a series of spaced, longitudinally extending tines 9, which as shown are pointed at both ends and fashioned on a curved line in order that they may drag over the ground when the implement is being used as a conveyer. The tines are located beneath the shaft in normal position, and above the shaft each tine has a longitudinal brace or strap 10. The tines and braces are secured to the shaft by a bolt as 10′ and the ends of the braces at the top surface of the tines are also fixed to the tines, as by screws or bolts 9′ thus providing a strong and well braced structure, which is further reinforced by the use of diagonally extending, crossed braces 11 attached to the tines at the rear of the shaft. The tines, braces and shaft thus form a rigid structure for picking up, conveying, and dumping material, and this structure is rotatable in the bearings 8 when the side arms 6 have their rear ends elevated to the required height as indicated by dotted lines in Fig. 1. Thus the implement may be driven, by horse power, or other power if required, and dragged over the surface of the ground to the material to be picked up the tines performing the function of runners to glide easily over the soil, and the upturned front ends of the tines are adapted to avoid obstructions.

An operating handle 12 extends upwardly and rearwardly from the approximate transverse center of the implement, and this handle is provided with a pair of spaced bearing plates 13 loosely embracing the shaft but forming rigid extensions of the operating handle to which they are attached as by a sleeve or ferrule 14. The handle is employed to guide the implement and to manipulate the drag during the operations of picking up the material and dumping the load, and under normal conditions the handle is operatively connected to the rock shaft 7 by means of a lever 15. This lever is affixed to the shaft by means of a loop 16 and the transverse bolt 17 passing through the loop and hollow shaft, and the lever extends toward the operating handle 12 with the free end of the lever in close proximity to the sleeve or ferrule 14 fixed to the handle 12. Within the ferrule is carried a slide retaining pawl 18 in position to normally project over the free end of the lever and co-act therewith in interlocking the handle, lever and rock shaft, as seen in Fig. 3. The pawl may be withdrawn from engagement with the lever by means of the rod 19 and the release lever 20 pivoted to the operating handle near the upper rear end and accessible for use by the driver of the implement. A spring 21 is utilized to hold the pawl in its operative position and return the pawl after having been withdrawn and then released by the release lever 20.

A second device is also employed to hold the handle and lever 15 in rigid relation comprising a dog 22 pivoted at 23 between the bearing plates 13 and co-acting with the pawl 18 to retain the free end of the lever between them. The dog is held in position by a spring 24 which is interposed in a socket 24' between the dog and a wall of the socket in the end of the handle, and the hook 25 of the dog engages the edge of the ferrule to limit the movement of the dog under the expanding action of the spring. The free end of the lever is thus restrained in its movement and retained between the pawl and the dog, but it will be apparent that the pawl may be retracted or withdrawn to release the lever and that the free end of the lever, while retained from downward movement by the dog in Fig. 3, may pass upwardly from below past said dog. In this movement the free end of the lever swings the dog on its pivot and the dog is pushed into the open end of the ferrule against the spring 24 which is compressed in its socket. After the free end of the lever passes over the dog in this upward movement the spring returns the dog to position of Fig. 3.

With the implement in position as shown in Fig. 1 it is driven or dragged to the required place, the horses passing over the stack setting. As the implement advances, by bearing upwardly, slightly on the rear end of the operating handle the front pointed ends of the tines are turned down to engage under and scoop up the material of the stack setting. The handle is then depressed slightly to elevate the front ends of the tines and bring the implement to the position as indicated in full lines Fig. 1. By horse power the loaded implement is drawn to the desired place for depositing the load and when such place is reached the driver lifts the rear end of the operating handle to swing the drag and the arms 6 on the axle as a support. At the same time the release lever 20 is manipulated to withdraw the pawl 18 from engagement with the lever 15, and as the rear ends of the tines are elevated the front ends are caused to dig into the soil. The continued advance of the horses causes the released drag to swing on the front ends of the tines as a center, elevating the rock shaft and causing the shaft to revolve in its bearings 8 until the drag reaches the vertical position indicated in Fig. 1 in dotted lines. The load is thus dumped and the continued advance of the horses causes the rear end of the drag to swing forward and downwardly to the ground making a half revolution of the drag. The curvature of the tines causes the normally rear ends thereof to now become embedded in the soil and the continued advance of the horses causes the drag to perform the second half of its revolution bringing the drag again to normal position. The pawl 18 is permitted to return to normal position to stop the movement of the lever 15 as it swings past the spring pressed dog 22 and the implement is again ready for another load.

Having thus fully described my invention what I claim as new and desire to secure by Letters Patent is—

1. The combination in a wheeled drag with a pair of side arms pivoted thereto, of a rock shaft journaled in said arms, tines secured to said shaft, an operating handle connected with said shaft, a lever fixed to said shaft, means on the handle for holding said lever, and release devices whereby the drag and shaft may be caused to move through one revolution for dumping and returning to normal position.

2. The combination with a revolvable shaft and means for revolving said shaft, fixed tines and a fixed lever on said shaft, of an operating handle loosely engaging said shaft, releasable means on the handle for normally engaging said lever, and a second device on the handle for co-action with said lever whereby the shaft may be actuated to move through one revolution.

3. In a revolvable-dumping drag the combination with a shaft having a fixed lever, of an operating handle loose on the shaft, a pawl on the handle engaging one side of the lever, and a spring pressed pivoted pawl carried by the handle engaging the other side of said lever for co-action with the releasable pawl.

4. In a wheel drag the combination with side arms pivoted thereto, a shaft journaled therein, curved tines secured to said shaft and means for bracing said tines, of a fixed lever on the shaft, an operating handle having bearing plates loose on said shaft, a slidable pawl on the handle for normally engaging one side of said lever, and a spring pressed pivoted dog carried by said handle for engaging the other side of said lever.

In testimony whereof I affix my signature.

CHARLES H. HEITSTUMAN.